US012260621B2

(12) United States Patent
Petrov et al.

(10) Patent No.: US 12,260,621 B2
(45) Date of Patent: Mar. 25, 2025

(54) METHOD FOR GENERATING IMAGES OF A VEHICLE-INTERIOR CAMERA

(71) Applicant: Continental Automotive Technologies GmbH, Hannover (DE)

(72) Inventors: Martin Petrov, Toulouse (FR); Sonia Yousfi, Toulouse (FR); Paul Mendez, Toulouse (FR); Holmer-Geert Grundmann, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 132 days.

(21) Appl. No.: 18/008,548

(22) PCT Filed: Jun. 7, 2021

(86) PCT No.: PCT/EP2021/065160
§ 371 (c)(1),
(2) Date: Dec. 6, 2022

(87) PCT Pub. No.: WO2021/254805
PCT Pub. Date: Dec. 23, 2021

(65) Prior Publication Data
US 2023/0230359 A1 Jul. 20, 2023

(30) Foreign Application Priority Data
Jun. 16, 2020 (FR) ...................................... 2006233

(51) Int. Cl.
*G06V 10/774* (2022.01)
*G06T 13/40* (2011.01)
(Continued)

(52) U.S. Cl.
CPC ............ *G06V 10/774* (2022.01); *G06T 13/40* (2013.01); *G06T 17/00* (2013.01); *G06V 10/776* (2022.01); *G06V 20/59* (2022.01)

(58) Field of Classification Search
None
See application file for complete search history.

(56) References Cited

U.S. PATENT DOCUMENTS 5,161,204 A * 11/1992 Hutcheson ........... G06V 10/431
708/821
9,665,800 B1 * 5/2017 Kuffner, Jr. .......... G06V 20/647
(Continued)

OTHER PUBLICATIONS

Chen et al., "Synthesizing Training Images for Boosting 3D Pose Estimation", 2016 Fourth International Conference on 3D Vision, 2016, pp. 479-488.
(Continued)

*Primary Examiner* — Jason A Pringle-Parker
(74) *Attorney, Agent, or Firm* — Buchanan Ingersoll & Rooney PC

(57) ABSTRACT

A method for generating synthetic images, each image simulating an image of an individual acquired by a vehicle interior camera, including: generating a plurality of models of individuals, each model including a three-dimensional representation of an individual's head; receiving a set of variable parameters and a probability distribution associated with each parameter; generating a set of configurations, each configuration corresponding to a combination of values or states taken by each parameter, such that the set of configurations is representative of the probability distribution of each parameter; generating, for each model of an individual, a set of images simulating images of the model of an individual acquired by a vehicle interior camera, where each image corresponds to a configuration generated for a variable parameter, and where each image further includes the three-dimensional positions of a set of points characterizing the individual's head; and storing all the images in a memory.

10 Claims, 2 Drawing Sheets

(51) Int. Cl.
*G06T 17/00* (2006.01)
*G06V 10/776* (2022.01)
*G06V 20/59* (2022.01)

(56) References Cited

U.S. PATENT DOCUMENTS

| | | | | |
|---|---|---|---|---|
| 9,760,827 | B1* | 9/2017 | Lin | G06N 3/08 |
| 10,068,385 | B2* | 9/2018 | Bleiweiss | G06V 20/64 |
| 10,235,601 | B1* | 3/2019 | Wrenninge | G06F 18/214 |
| 2011/0002531 | A1* | 1/2011 | Heisele | G06F 18/214 |
| | | | | 382/154 |
| 2013/0329951 | A1* | 12/2013 | Kannan | G06V 40/167 |
| | | | | 382/103 |
| 2014/0176551 | A1* | 6/2014 | Heisele | G06T 15/00 |
| | | | | 345/427 |
| 2017/0069124 | A1 | 3/2017 | Tong et al. | |
| 2017/0169620 | A1* | 6/2017 | Bleiweiss | G06V 20/64 |
| 2018/0181802 | A1* | 6/2018 | Chen | G06V 10/764 |
| 2018/0268255 | A1* | 9/2018 | Surazhsky | G06N 3/045 |
| 2019/0130603 | A1* | 5/2019 | Sun | G06N 3/045 |
| 2019/0251397 | A1* | 8/2019 | Tremblay | G06F 18/2148 |
| 2019/0303759 | A1* | 10/2019 | Farabet | G05D 1/00 |
| 2019/0370580 | A1* | 12/2019 | Aoi | G06V 40/193 |
| 2020/0242379 | A1* | 7/2020 | Mabuchi | G06T 7/73 |
| 2021/0182609 | A1* | 6/2021 | Arar | G06F 18/214 |
| 2021/0390767 | A1* | 12/2021 | Johnson | G06V 40/176 |
| 2022/0058407 | A1* | 2/2022 | Yang | G06T 7/30 |

OTHER PUBLICATIONS

Dahmen et al., "Digital Reality: A Model-Based Approach to Supervised Learning from Synthetic Data", A1 Prospectives, 2019, vol. 1, No. 1, 12 pages.
Fridman et al., "MIT Advanced Vehicle Study: Large-Scale Naturalistic Driving Study of Driver Behavior and Interaction with Automation", 2019, 16 pages.
Gu et al., "Dynamic Facial Analysis: From Bayesian Filtering to Recurrent Network", 2017, pp. 1548-1557.
Liu et al., "3D Head Pose Estimation With Convolutional Neural Network Trained on Synthetic Images", 2016 IEEE International Conference on Image Processing, 2016, pp. 1289-1293.
Sancheti et al., "Camera Based Driver Monitoring System Using Deep Learning", downloaded at www.visteon.com/wp-content/uploads/2019/04/camera-based-driver-monitoring-system-using-deep-learning.pdf, 2019, 5 pages.
International Search Report and Written Opinion for International Application No. PCT/EP2021/065160, dated Aug. 20, 2021, 11 pages.
International Search Report and Written Opinion for International Application No. PCT/EP2021/065160, dated Aug. 20, 2021, 16 pages (French).
French Search Report for French Application No. 2006233, dated Nov. 24, 2020 with translation, 13 pages.

* cited by examiner

METHOD FOR GENERATING IMAGES OF A VEHICLE-INTERIOR CAMERA

CROSS REFERENCE TO RELATED APPLICATIONS

This application is the U.S. National Phase Application of PCT International Application No. PCT/EP2021/065160, filed Jun. 7, 2021, which claims priority to French Patent Application No. FR2006233, filed Jun. 16, 2020, the contents of such applications being incorporated by reference herein.

FIELD OF THE INVENTION

The present application relates to a method for generating synthetic images, simulating images of individuals acquired by a vehicle interior camera. The application is advantageously applicable to the learning or validation of algorithms for processing images acquired by a vehicle interior camera.

BACKGROUND OF THE INVENTION

Machine learning algorithms require large amounts of training data to be reliable. This is particularly the case for algorithms based on the processing of images acquired by a vehicle interior camera oriented toward a driver or a passenger of the vehicle, which may have various applications such as detecting points characterizing the face, detecting drowsiness or detecting distraction, etc.

It may be difficult to obtain training data, i.e. images acquired by a vehicle interior camera, that covers a sufficiently wide variety of possible acquisition conditions, since that would involve driving different vehicle models, under different conditions, with different passengers or drivers, etc. In addition, to train or validate such algorithms, the learning database should also comprise extreme cases, whatever the parameter in question (user position, brightness, blur level, etc.), which may be difficult to obtain.

In addition, building a training database can be extremely time-consuming because each image acquired by a vehicle interior camera must then be manually annotated to identify characteristic points in the image. Considering a manual annotation time of the order of 2 to 4 minutes per image, it is easy to understand the cost and time required to annotate a database of images potentially comprising tens or even hundreds of thousands of images.

SUMMARY OF THE INVENTION

An aspect of the invention aims to improve the situation. In particular, one aspect of the invention aims to allow the creation of a database of images acquired by a vehicle interior camera more simply and less expensively.

Another aspect of the invention is obtaining an image database which also includes extreme cases for the variable parameters.

To that end, an aspect of the invention provides a method for generating synthetic images, each image simulating an image of an individual acquired by a vehicle interior camera, the method being implemented by a computer and comprising:

generating a plurality of models of individuals, each model comprising a three-dimensional representation of an individual's head, receiving a set of variable parameters and a probability distribution associated with each parameter, the parameters relating to at least one from the environment of the model of an individual and the posture or position of the model of the individual in relation to their environment, generating a set of configurations, each configuration corresponding to a combination of values or states taken by each parameter, such that the set of configurations is representative of the probability distribution of each parameter, generating, for each model of an individual, a set of images simulating images of the model of an individual acquired by a vehicle interior camera, where each image corresponds to a configuration generated for a variable parameter, and where each image further comprises the three-dimensional positions of a set of points characterizing the individual's head, and storing all of the images in a memory.

In one embodiment, the method further comprises generating a plurality of models of vehicles, and the image-generating step is implemented for each model of an individual in each model of a vehicle.

In one embodiment, the method comprises generating, for each model of an individual, a set of images comprising an image for each of the configurations generated for each of the received variable parameters.

In one embodiment, the method further comprises receiving a number N of configurations per model of an individual, and generating, for each model of an individual, a set of configurations comprising a total of N configurations for the set of variable parameters.

In one embodiment, the method comprises receiving at least one variable parameter relating to the camera from the group consisting of:
position and/or orientation of the camera,
contrast level,
blur level,
camera exposure,
noise level.

In one embodiment, the method comprises receiving at least one variable parameter relating to a position of the individual relative to a seat of the vehicle and/or at least one variable parameter relating to the environment of the model of an individual, including:
brightness and/or light direction,
environment outside the vehicle.

In one embodiment, the method further comprises:
receiving, for each individual model, at least one movement performed by the individual model,
generating, for at least one configuration of the variable parameters, a video representing the model of an individual performing the movement, and
storing said video and each image making up said video in the memory.

Another aspect of the invention is a method for learning or validating an algorithm based on processing an image acquired by a vehicle interior camera, comprising:
determining a set of variable parameters and a probability distribution associated with each variable parameter,
creating an image database where each synthetic image or each image simulates an image of an individual acquired by a vehicle interior camera and further comprises three-dimensional positions of points characterizing the individual's face by implementing the method as described above, and learning or validating the algorithm using the image database thus created.

Another aspect of the invention is the use of a database of images generated by implementing the method according to the description above for learning or validating an algorithm based on processing an image acquired by a vehicle interior camera.

An aspect of the invention also relates to a computer program product comprising code instructions for implementing the methods according to the description above when it is executed by a computer.

Lastly, an aspect of the invention relates to a device for generating synthetic images simulating images of individuals acquired by a vehicle interior camera, comprising a computer and a memory, in which the computer is configured to implement the methods according to the description above.

An aspect of the proposed invention makes it possible to artificially generate an image database where each image simulates an image taken by a vehicle interior camera. The images in the image database represent multiple models of individuals, in variable contexts obtained by varying different parameters according to distribution probabilities. This allows the image database to be representative of all configurations and their probabilities of occurrence.

Furthermore, the generated images already comprise, by virtue of the models of individuals which are three-dimensional models of faces, three-dimensional positions of points characterizing the head of the represented individual. It is therefore not necessary to manually annotate each image, which affords a significant saving of time.

BRIEF DESCRIPTION OF THE DRAWINGS

Other features, details and advantages will become apparent from reading the following detailed description and from analyzing the appended drawings, in which.

DETAILED DESCRIPTION OF THE EMBODIMENTS

Figure 1:
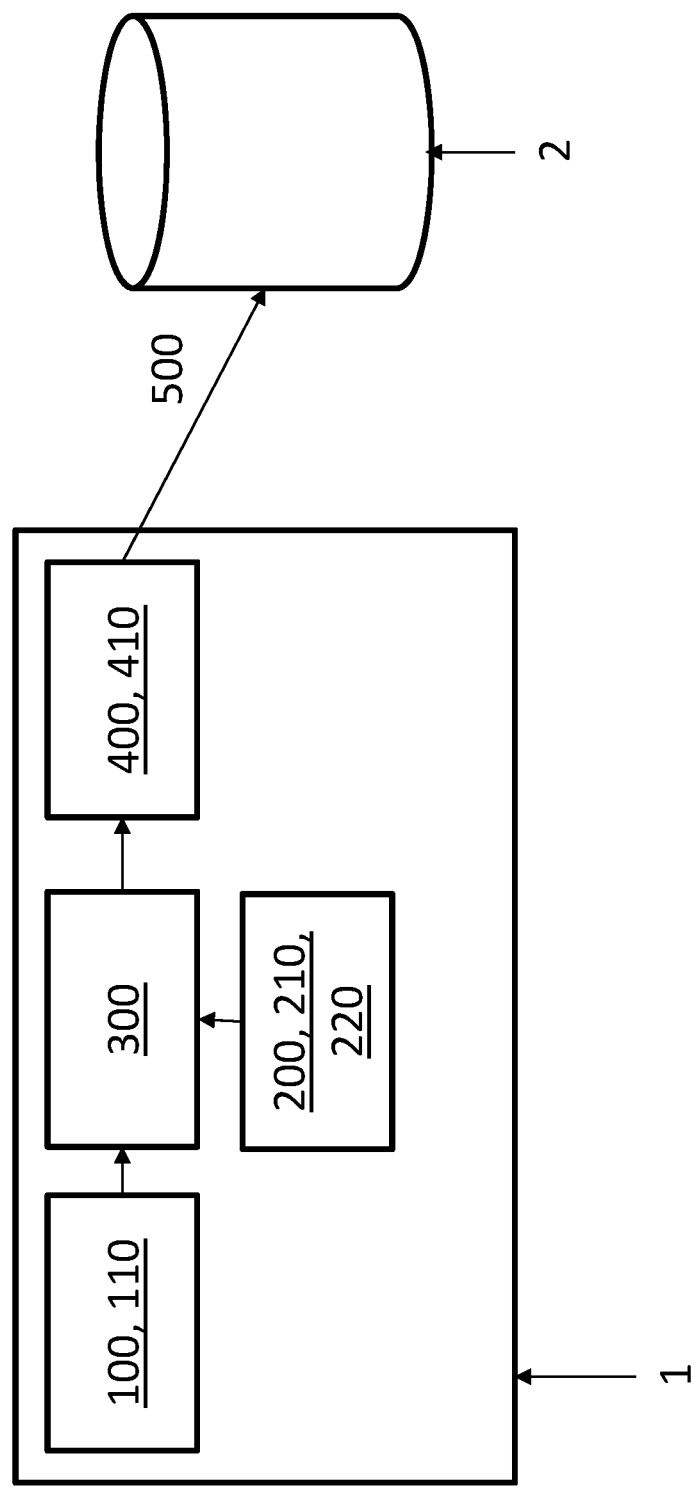
FIG. 1 schematically shows an exemplary implementation of a method for generating synthetic images.

With reference to FIG. 1, the method for generating synthetic images is implemented by a computer 1 which may be, for example, a processor, a microprocessor, a controller, a microcontroller, etc.

This method makes it possible to quickly generate a large quantity of synthetic images, where each synthetic image represents the head of an individual in a vehicle, and simulates an image of the individual that would have been taken by a vehicle interior camera. As described in more detail below, the images are generated by varying a number of parameters in order to enrich the resulting image database.

The method comprises generating 100 a plurality of models of individuals, also called avatars. Each model of an individual comprises a three-dimensional representation of an individual's head. Specifically, each model of an individual may comprise a three-dimensional point cloud, corresponding to the contours of the head and face, and a texture applied to the point cloud, simulating the appearance of the individual's head, that is to say an image whose points are associated with a color or a brightness level that allows, once applied over the contours of the head, the head to be given a human appearance.

In one embodiment, at least ten, and preferably several dozen, different models of individuals are generated.

In addition, the models of individuals are generated by varying a set of parameters comprising all or some of the following parameters:
gender,
ethnicity,
presence of accessories on the head (jewelry, glasses, etc.),
facial features (size of the face and of its parts, presence or absence of a beard, degree of protrusion of the ears, etc.),
hair features,
age.

The models of individuals may be generated by running algorithms known or accessible to those skilled in the art. For example, reference may be made to document US20170069124, incorporated herein by reference, which also teaches the animation of the created models of individuals, or to the StyleGAN software developed by NVidia.

In one embodiment, the method also comprises generating 110 multiple vehicle models, each vehicle model comprising a three-dimensional representation of the passenger compartment of a vehicle. This makes it possible to generate images of the models of individuals in different vehicle models.

The method next comprises receiving 200 a set of variable parameters and a probability distribution associated with each parameter. The parameters may be selected by a user. What is understood by "variable parameter" is that each parameter may take a plurality of values or states. A variable parameter may correspond to a continuous or discrete quantity.

Preferably, the received parameters relate to at least one from the environment of the model of an individual, the posture of the individual, i.e. the orientation of the individual's head, or the position of the individual relative to their environment, that is to say the vehicle in which they are situated, and more particularly the position of the individual's head relative to the seat of the vehicle in which they are seated.

In particular, the parameters relating to the environment of the model of an individual may comprise parameters relating to the vehicle's interior camera, including in particular:
the position and/or orientation of the camera,
its contrast level,
the blur level, which may include a blur level associated with each camera ground (foreground, where the individual is situated, and background),
camera exposure,
noise level.

The parameters relating to the environment of the model of an individual may also comprise the environment outside the vehicle, which is visible through the vehicle's windows and may appear in an image acquired by an interior camera, depending on its position and orientation.

The parameters relating to the environment of the model of an individual may also comprise the brightness and/or the direction of the light illuminating the scene acquired by the interior camera. These parameters are particularly variable depending on the time of day or night, and the weather conditions in question.

The probability distribution associated with each parameter may also be selected or configured by the user. The probability distributions may, for example, be Gaussian or uniform depending on the parameters in question.

In one embodiment, the method may also comprise receiving 210 a movement or a series of movements that each model of an individual is to perform, which may be indicated by the user. This step may also be implemented in avatar-model-generating step 100, if it is the avatar-generating algorithm which has this functionality. The movement or the series of movements to be performed for an individual may be defined by an initial position (for example orientation of the individual's head at three angles), a final position, or a speed of movement between the initial position and the final position. Step 210 may also comprise receiving the number of times the movement is performed in a video.

The method next comprises generating 300 a set of configurations, each configuration corresponding to a combination of values or states taken by each of the received variable parameters.

By way of purely schematic example, if the parameters comprise a brightness level, a type of vehicle environment, and a position of the individual relative to the seat, a first configuration may comprise:
- a high brightness level,
- an urban outside environment,
- a low position of the individual relative to the seat.

A second configuration may comprise:
- a high brightness level,
- a rural outside environment,
- a high position of the individual relative to the seat.

In addition, the configurations are generated by varying each parameter according to its associated probability distribution, so that the set of configurations is representative of the probability distribution of each parameter.

The obtained set of configurations may, for example, take the form of a configuration file, where each configuration is defined by the value or the state taken by each parameter.

In one embodiment, the method comprises receiving 220 a number N of configurations to be generated, and generating the configurations therefore comprises generating a total of N configurations, for the set of received variable parameters. The number N may be defined by the user according to the quantity of images that they seek to produce on completion of the method, which also depends on the number of models of individuals and the number of vehicle models.

The method next comprises generating 400, for each model of an individual, a set of images simulating images of the model of an individual acquired by a camera inside the vehicle, where each image corresponds to one of the generated configurations. In one embodiment, the method comprises generating, for each model of an individual, and for each vehicle model, a set of images comprising an image for each of the generated configurations. There is therefore obtained a total number of images equal to the number N of configurations, multiplied by the number of models of individuals, or multiplied by the number of models of individuals and the number of vehicle models.

Figure 2:
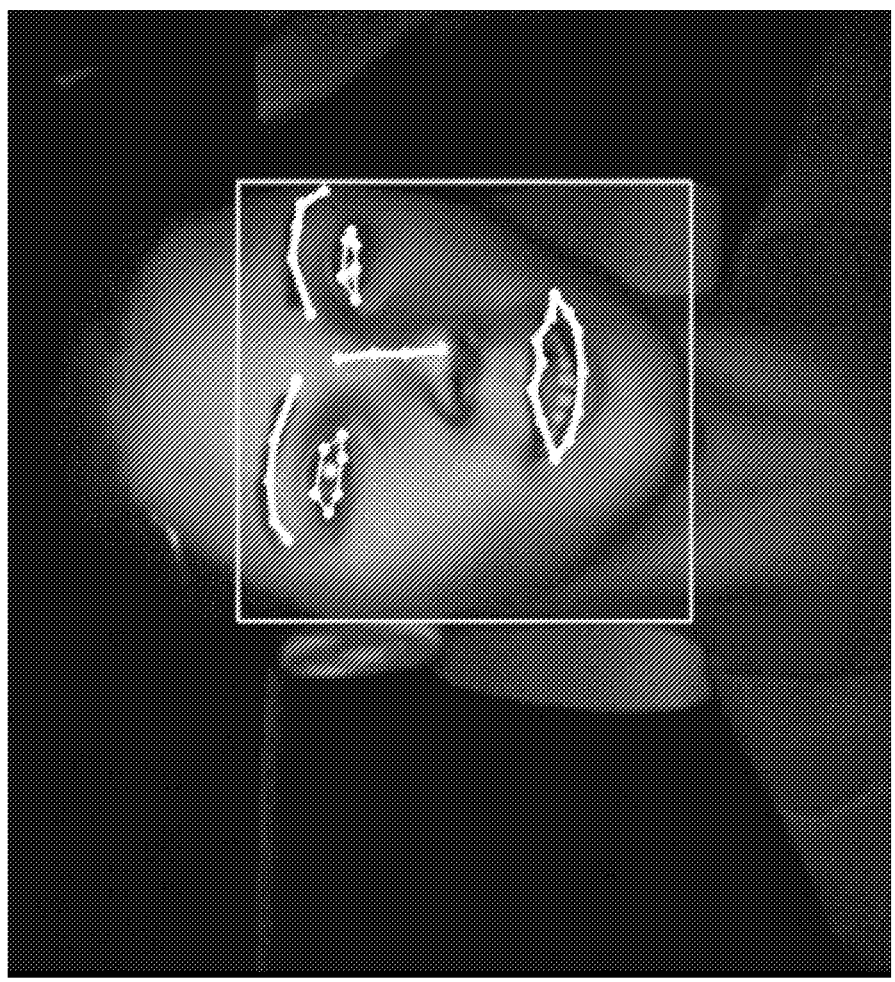
FIG. 2 shows an example of a synthetic image generated by implementing the method.

In addition, since each model of an individual comprises a set of three-dimensional points corresponding to the points characterizing the head and the face, the positions of these points are known, which allows each generated image also to comprise the positions of said points characterizing the individual's head in the image. An example of an image where the positions of the points characterizing the individual's face are highlighted is shown in FIG. 2. In this way, there is no need to manually annotate the images for later use.

In the case where a user has indicated a series of movements that each model of an individual is to perform, the method may comprise, for at least one configuration, or for multiple, or even all of the configurations, generating 410 a video representing the series of movements performed by the model of an individual, and generating all of the images of which it is composed.

Lastly, the method comprises storing 500, in the memory 2, all of the images (and the positions of the associated characteristic points) and videos, so as to form a rich database comprising multiple models of individuals, in multiple vehicle models, and with highly varied parameters including, in particular, extreme values of parameters.

Once this database has been created, it may then be used directly for learning, or validating, an algorithm based on processing an image acquired by a vehicle interior camera, in particular a machine learning algorithm.

In one embodiment, depending on the use to be made of a database, for example, but not limited to, validating an algorithm under certain specific conditions, the user may determine the necessary variable parameters to be provided to implement the method.

The invention claimed is:

1. A method for generating synthetic images, each image simulating an image of an individual acquired by a vehicle interior camera, the method being implemented by a computer and comprising:
    generating a plurality of models of individuals, each model of the plurality of models of individuals comprising a three-dimensional representation of an individual's head;
    receiving a set of variable parameters and a probability distribution associated with each parameter of the set of variable parameters, the set of variable parameters relating to at least one of an environment of a corresponding model of an individual and a posture or a position of the corresponding model of the individual in relation to the environment, wherein at least one parameter of the set of variable parameters relates to the posture or the position of the individual in an interior of the vehicle, characteristics of the vehicle interior camera, or an image acquired by the vehicle interior camera;
    receiving at least one parameter of the set of variable parameters, the at least one parameter relating to characteristics of the vehicle interior camera, including at least one of:
    a position and/or an orientation of the vehicle interior camera,
    a contrast level,
    a blur level,
    a camera exposure, or
    a noise level;
    generating a set of configurations, each configuration corresponding to a combination of values or states taken by each parameter of the set of variable parameters, such that the set of configurations is representative of the probability distribution associated with each parameter of the set of variable parameters;
    generating, for each corresponding model of the individual, a set of images simulating images of the corresponding model of the individual acquired by the vehicle interior camera, where each image of the set of images corresponds to a configuration generated for a corresponding parameter of the set of variable parameters, and where each image of the set of images further comprises three-dimensional positions of a set of points characterizing the individual's head; and storing all of the images in a memory.

2. The method as claimed in claim 1, further comprising generating a plurality of models of vehicles, and the image-generating step is implemented for each model of the plurality of models of individuals in each model of a vehicle.

3. The method as claimed in claim 1, comprising generating, for each model of the plurality of models of individuals, a set of images comprising an image for each of the configurations generated for each parameter of the received set of variable parameters.

4. The method as claimed in claim 1, further comprising receiving a number N of configurations per the corresponding model of the individual, and generating, for each corresponding model of the individual, a set of configurations comprising a total of N configurations for the set of variable parameters.

5. The method as claimed in claim 1, further comprising:
receiving, for each model of the plurality of models of individuals, at least one movement performed by the corresponding model of the individual;
generating, for at least one configuration of the set of variable parameters, a video representing the corresponding model of the individual performing the movement; and
storing said video and each image making up said video in the memory.

6. The use of a database of images generated by implementing the method as claimed in claim 1 for learning or validating an algorithm based on processing of the image acquired by the vehicle interior camera.

7. A non-transitory computer program product comprising code instructions for implementing the method as claimed in claim 1 when the code instructions are executed by a computer.

8. A device for generating synthetic images simulating images of individuals acquired by a vehicle interior camera, comprising a computer and a memory, in which the computer is configured to implement the method as claimed in claim 1.

9. A method for generating synthetic images, each image simulating an image of an individual acquired by a vehicle interior camera, the method being implemented by a computer and comprising:
generating a plurality of models of individuals, each model of the plurality of models of individuals comprising a three-dimensional representation of an individual's head;
receiving a set of variable parameters and a probability distribution associated with each parameter of the set of variable parameters, the set of variable parameters relating to at least one of an environment of a corresponding model of an individual and a posture or a position of the corresponding model of the individual in relation to the environment;
receiving at least one parameter of the set of variable parameters, the at least one parameter relating to a position of the individual relative to a seat of the vehicle and/or at least one parameter of the set of variable parameters relating to the environment of the corresponding model of the individual, including at least one of:
a brightness and/or a light direction, and
an environment outside the vehicle;
generating a set of configurations, each configuration corresponding to a combination of values or states taken by each parameter of the set of variable parameters, such that the set of configurations is representative of the probability distribution associated with each parameter of the set of variable parameters;
generating, for each corresponding model of the individual, a set of images simulating images of the corresponding model of the individual acquired by the vehicle interior camera, where each image of the set of images corresponds to a configuration generated for a corresponding parameter of the set of variable parameters, and where each image of the set of images further comprises three-dimensional positions of a set of points characterizing the individual's head; and
storing all of the images in a memory.

10. A method for learning or validating an algorithm based on processing an image acquired by a vehicle interior camera, the method being implemented by a computer and comprising:
generating a plurality of models of individuals, each model of the plurality of models of individuals comprising a three-dimensional representation of an individual's head;
receiving a set of variable parameters and a probability distribution associated with each parameter of the set of variable parameters, the set of variable parameters relating to at least one of an environment of a corresponding model of an individual and a posture or a position of the corresponding model of the individual in relation to the environment, wherein at least one parameter of the set of variable parameters relates to the posture or the position of the individual in an interior of the vehicle, characteristics of the vehicle interior camera, or an image acquired by the vehicle interior camera;
generating a set of configurations, each configuration corresponding to a combination of values or states taken by each parameter of the set of variable parameters, such that the set of configurations is representative of the probability distribution associated with each parameter of the set of variable parameters;
generating, for each corresponding model of the individual, a set of images simulating images of the corresponding model of the individual acquired by the vehicle interior camera, where each image of the set of images corresponds to a configuration generated for a corresponding parameter of the set of variable parameters, and where each image of the set of images further comprises three-dimensional positions of a set of points characterizing the individual's head;
storing all of the images in a memory;
creating an image database where each synthetic image or each image simulates an image of the individual acquired by the vehicle interior camera and further comprises three-dimensional positions of points characterizing an individual's face; and
learning or validating the algorithm using the created image database.

* * * * *